Aug. 26, 1930. S. D. LOCKE 1,773,738
PROCESS AND APPARATUS FOR MAKING CHAIN LINKS
Original Filed March 7, 1923 4 Sheets-Sheet 2

INVENTOR
Sylvanus D. Locke
BY
G. H. Braddock
ATTORNEY

Aug. 26, 1930.    S. D. LOCKE    1,773,738
PROCESS AND APPARATUS FOR MAKING CHAIN LINKS
Original Filed March 7, 1923    4 Sheets-Sheet 3
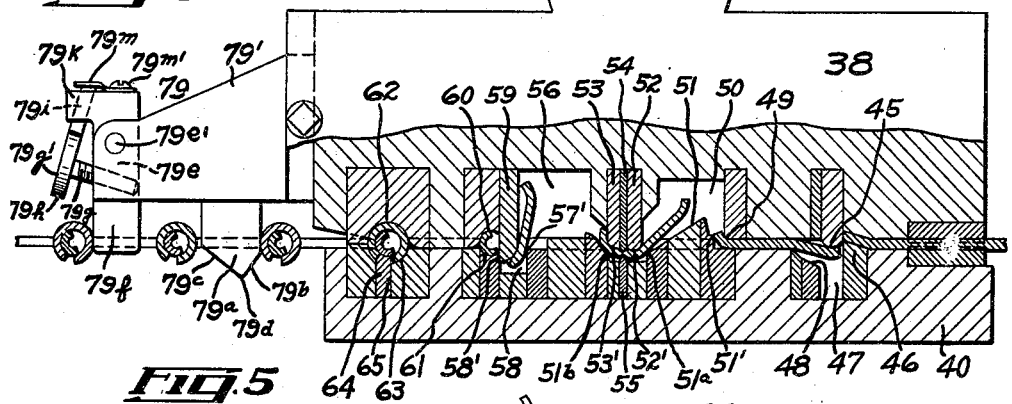
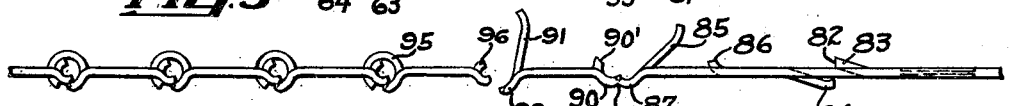
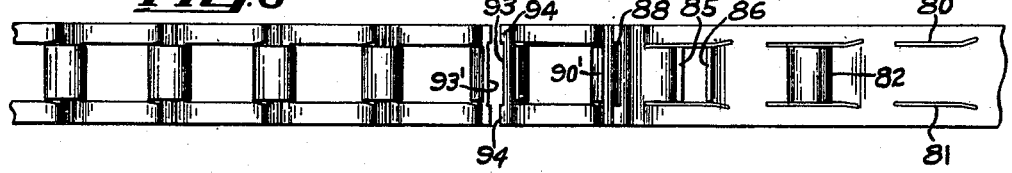
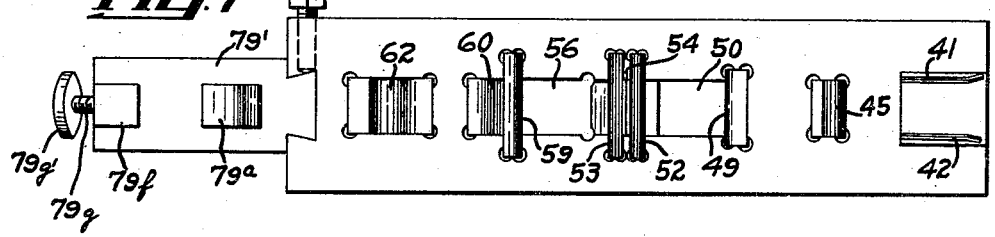
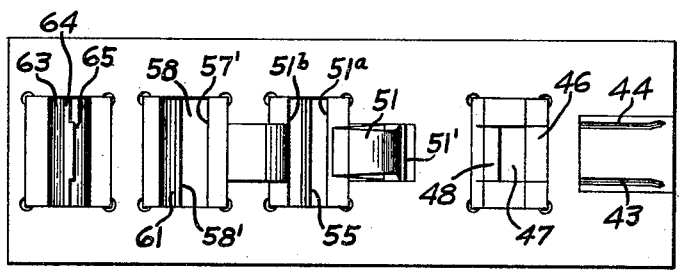
INVENTOR
*Sylvanus D. Locke*
BY
*G. H. Braddock*
ATTORNEY

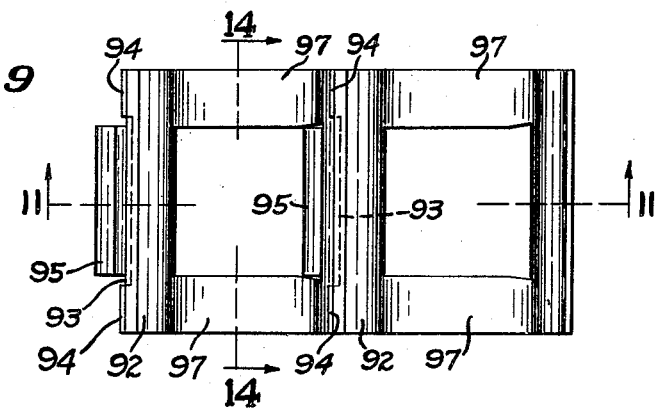
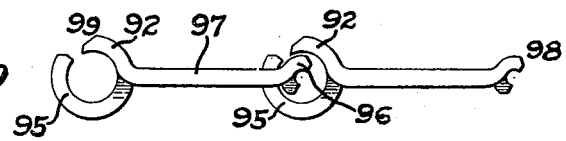
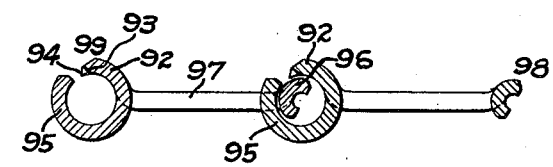
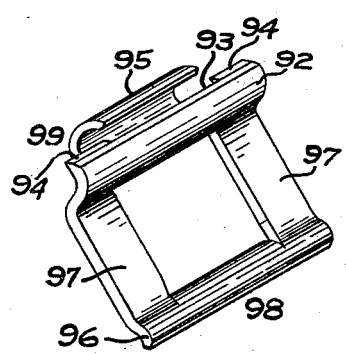
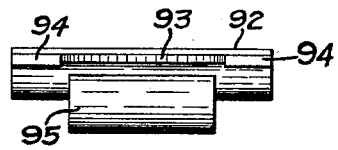
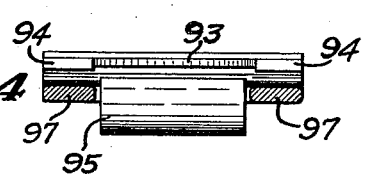
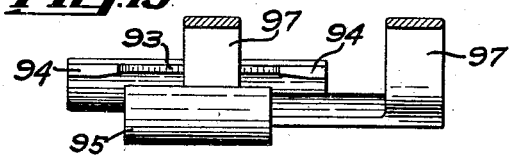
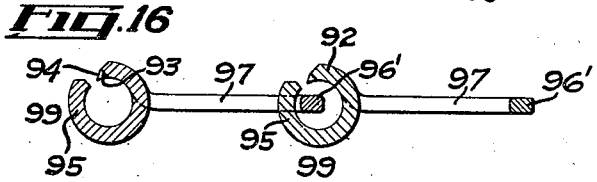

Patented Aug. 26, 1930

1,773,738

UNITED STATES PATENT OFFICE

SYLVANUS D. LOCKE, OF BRIDGEPORT, CONNECTICUT

PROCESS AND APPARATUS FOR MAKING CHAIN LINKS

Application filed March 7, 1923, Serial No. 623,435. Renewed December 31, 1929.

This invention relates to an apparatus for and a process of making and assembling sheet metal chain links. It is an improvement upon the invention of Osswald, disclosed and patented in his Letters Patent of the United States No. 1,107,831, granted Aug. 18, 1914, and No. 1,157,175, granted Oct. 19, 1915.

Each of the duplicate chain links illustrated and described in the patents to Osswald, above identified, consists, generally, of side bars, a relatively small end bar, and a relatively large end bar or end hook, the relatively large end bar or end hook of a link being adapted to be formed around the relatively small end bar of a different link in the assembling operation of links to produce chain. That is to say, the links of the Osswald chain are similar and each connection or joint between said links is constituted by a sprocket or large end bar of one link encircling or enveloping a small end bar of a different link. The sprocket or large end bar consists of a short, relatively wide lip and a long, relatively narrow lip, the former being approximately the width of a link and the latter being of a width to enter the space between the side bars of a link. The ends of said wide and narrow lips of said sprocket or large end bar are spaced apart a predetermined distance or amount, viz., less than the measurement representing the thickness of the metal of which the links are composed. Obviously, the space between the ends of the sprocket bar can not be equal to or greater than the thickness of the metal composing the links, or the links might have relative transverse movement to become accidentally disassembled when the chain is in use. The thickness of the strip of metal from which links such as Osswald's are made necessarily varies, and the distance between the ends of the lips of the sprocket bar must, therefore, be an appreciable amount less than the measurement representing the mean thickness of the strip. When it is desired to remove the Osswald link from a strand of chain, it is necessary to arrange adjacent links so that the side bars of one link are in alinement with the space between the ends of the lips of the sprocket or large end bar of a different link and to then hammer the link to be removed until a side bar has moved transversely of said different link through the whole length of the space between the ends of said lips of the sprocket bar. Naturally, some considerable force is required to thus detach a link, (for example, a broken or impaired ink), from chain, not to mention the time necessarily consumed in removing the link.

The invention aims to provide an apparatus and a process for making a chain link having a small end bar and a sprocket or large end bar adapted to encircle a small end bar of a different link when assembled to produce a strand of chain, the sprocket or large end bar having free, spaced apart ends and one of said ends having a slot intermediate its extremities, whereby the link, when assembled, is insured against accidental displacement, but is capable of being much more readily and easily removed from or manually attached to another link than is a link constructed as illustrated and described in the Osswald patents mentioned.

In chains having links of the nature of those of the Osswald patents the stress on the sprocket or large end bar of each link, when in use, is against the long, narrow lip of said bar, and, consequently, the cross section of metal in said long lip, particularly at and adjacent to the end thereof, should be as great as possible, but the short, wide lip of said sprocket or large end bar, is under practically no stress when the chain is in use. I have, therefore, illustrated chain links of the general nature of those of the Osswald patents and have provided the end of the short, wide lip of the sprocket bar of each link with a detaching slot, the material of said wide lip end adjacent the extremities of the slot being spaced from the plane of the end of the long lip of the sprocket bar a distance a little less than the measurement representing the mean thickness of the metal of which the links are composed to constitute detaching keepers for insuring the assembled relation of each sprocket bar of one link with a small end bar of a different link. I desire it understood, however, that the novel link of the present invention could be of modified form, all as will hereinafter fully appear, within the spirit of the present invention. I have preferred to disclose a detaching slot which is a trifle longer than a measurement representing the length of the long lip of the sprocket bar, but the length of the slot may be varied to suit conditions.

The apparatus and process disclosed and now to be fully described, have been devised for the specific purpose of producing a practical chain link in which the features of the invention are incorporated, the apparatus and process having been developed with the idea in view of caring for the proper spacing of the ends of the lips of the sprocket or large end bar and the proper defining and positioning of the detaching slot in the end of the wide lip of said sprocket bar.

Other objects of the invention will be obvious from the drawings and description of the machine, process and link embodying the invention which I have herein selected for the purpose of illustration.

Fig. 4 is a still larger view of the dies, showing them in section with a strip of metal between them; a portion of the sizing mechanism is also shown;

Fig. 5 is an edge view of the strip of metal in process of formation into a chain, some formed and coupled links being shown;

Fig. 6 is a top plan view of the metal strip and chain shown in Fig. 5;

Fig. 7 is a bottom plan view of the movable die and stretcher mechanism;

Fig. 8 is a top plan view of the stationary die;

Fig. 9 is an enlarged bottom plan view of a pair of assembled novel links in which the features of the invention are incorporated;

Fig. 10 is an edge view looking toward the bottom edge of Fig. 9;

Fig. 11 is a sectional view on line 11—11 in Fig. 9;

Fig. 12 is a perspective view of the novel link of the invention;

Fig. 13 is an end view of the link of Fig. 12 looking toward the large end of said link;

Fig. 14 is a sectional view on line 14—14 in Fig. 9;

Fig. 15 is a sectional view corresponding with the showing of Fig. 14, disclosing the links as when being disassembled or manually assembled; and Fig. 16 is a sectional view corresponding with the showing of Fig. 11, disclosing a modified form of chain link.

Figure 1:
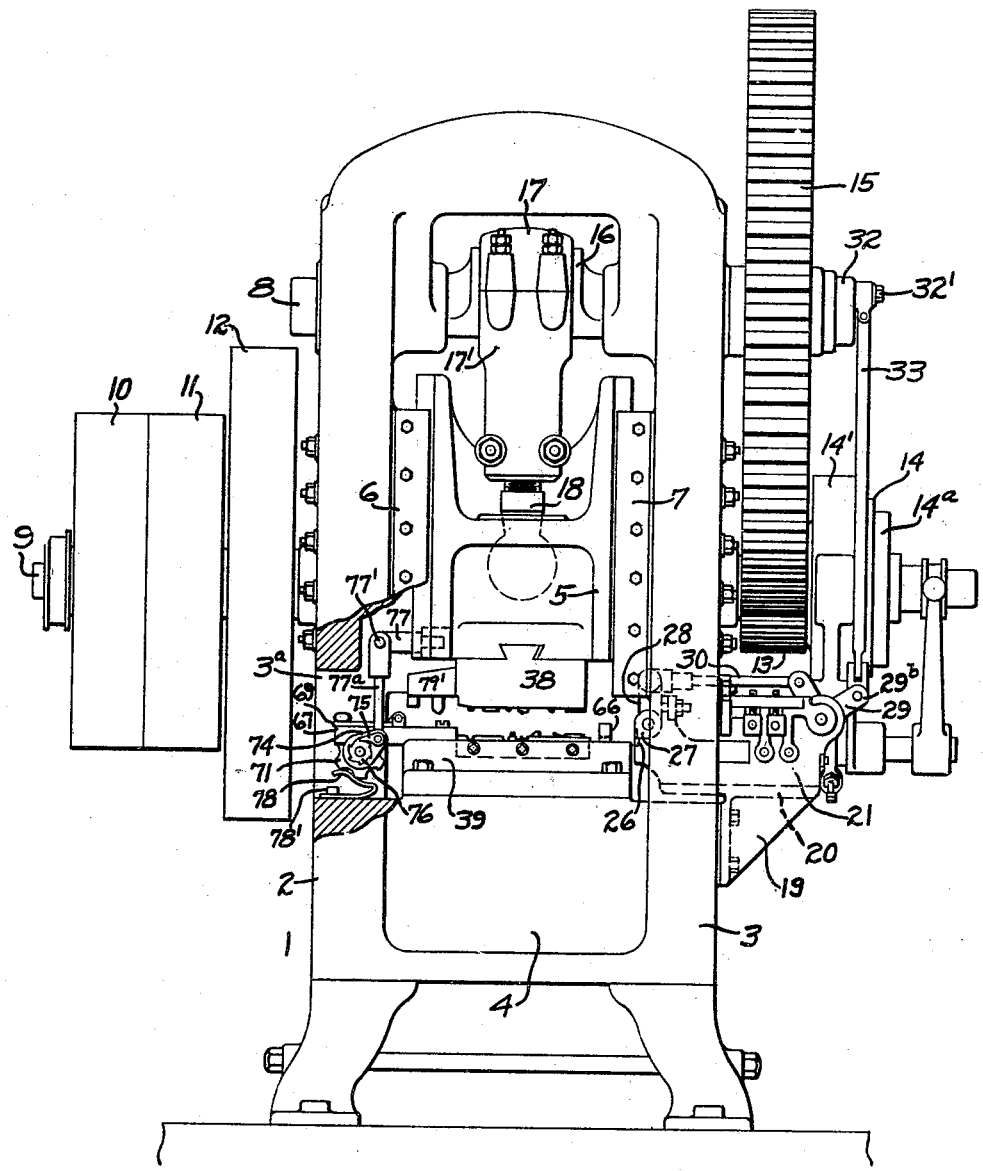
Fig. 1 is a front view partly in section of a machine embodying the improvements and adapted to make chain links and assemble them.

In the drawings, 1 indicates as an entirety the main frame of the machine comprising uprights 2, 3 and a bed 4 arranged between the uprights.

5 is a vertically reciprocatable slide mounted to move up and down in guides 6, 7, on the main frame.

8 is a main drive shaft transversely mounted in bearings at the upper end of the frame. 9 is a countershaft transversely mounted upon the main frame and extending from one side to the other thereof. At one side of the main frame the counter shaft carries a loose pulley 10, a fast pulley 11, and a fly wheel 12. At the other side of the frame the said countershaft has mounted loosely upon it, a pinion 13 carrying one element 14' of a clutch 14, the other element 14ª of which is splined to the countershaft 9. Any suitable mechanism may be employed for throwing the longitudinally movable element 14ª of said clutch into and out of engagement with the element 14' so as to transmit power through the pinion 13. 15 is a gear wheel rigidly secured to said main shaft and in mesh with the pinion 13. 16 is an eccentric on the main shaft 8 connected by eccentric straps 17, 17' and pitman 18 to the slide 5.

As the construction of the press in itself forms no part of the invention, any well known type of press having a reciprocable slide and a bed or bolster beneath it may be readily adapted to operate the chain link forming and assembling mechanism to be hereinafter described, and no further description of the press shown in the drawings is deemed necessary as this particular press has been chosen simply for illustrative purposes and not in any limiting sense.

Any suitable mechanism may be attached to the press for feeding the stock or strip of metal from which the chain links are to be formed across the bed or bolster of the press. For the purpose of illustration I have, in the drawings, shown a feed mechanism of which 19 is a bracket secured to the standard 3 of the frame and having a horizontally disposed platform 20, the inner end of which extends into a hole 3' through the standard 3.

21, 21 are side walls extending vertically upward, one at each side of the platform 20. 22 is a horizontally reciprocable slide suitably mounted at either side in guideways in the said side walls 21. It rests upon a horizontally disposed friction plate 23 having downwardly extending pins 24, 24, each surrounded by a coil spring 25 bearing at its upper end against the plate 23 and at its lower end against the platform 20 so as to provide a yielding support for the slide 22 which normally tends to press the slide against the upper walls of its guideways to insure the closing of the feed jaws, to be hereinafter described, before the slide commences to move forward.

26 is a gripping piece carried by the slide 22, having an upwardly turned jaw 26′ adapted to engage the under surface of the stock or strip of metal to be fed across the bed or bolster.

27 is an oscillatable gripping dog having a jaw 27′ adapted to engage the upper surface of the strip of metal to be fed, at a point directly above the gripping jaw 26.′ This gripping dog 27 is pivotally mounted between upwardly extending lugs or ears 22′, 22′ on the slide 22, and carries an upwardly extending arm 28.

29 is a bell crank lever pivotally connected at 29′ between the side walls 21 of the bracket 19.

30 is a rod pivotally connected at 30′ to the upper end of the arm 28, and at 30ᵃ to the free end of the arm 29ᵃ of the bell crank lever 29.

31 is an adjustable stop for limiting the throw of the arm 28 in clockwise direction. This stop preferably consists of a screw extending through a threaded opening in a cross bar 22ᵃ, which latter extends between the ears 22′, 22′ on the slide 22.

32 is a crank disk carried by the main drive shaft 8 and having a crank pin 32′ to which is pivotally connected one end of a connecting rod 33, the other end of which is suitably connected to the free end of the arm 29ᵇ of the bell crank lever 29.

Figure 2:
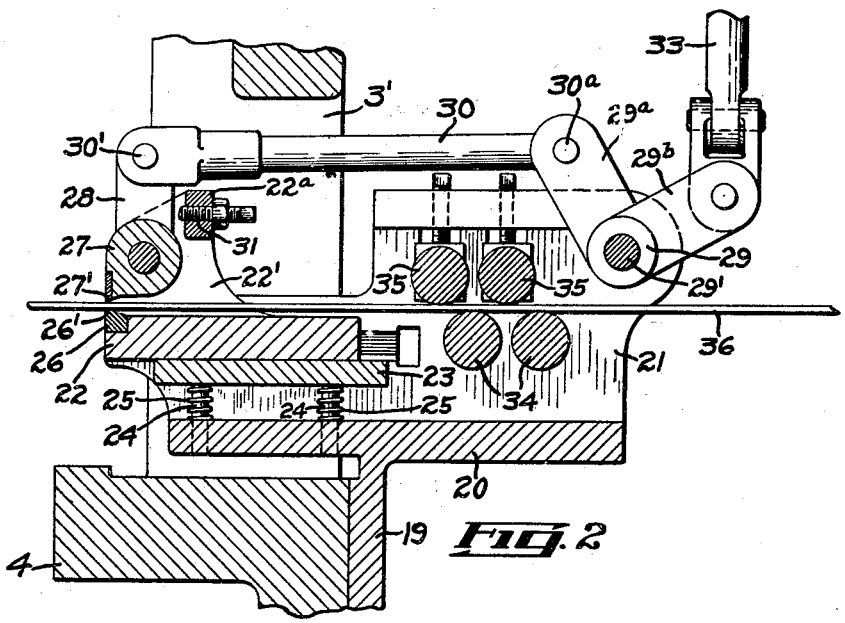
Fig. 2 is an enlarged view partly in side elevation and partly in section of the strip feed mechanism on the machine.
Figure 3:
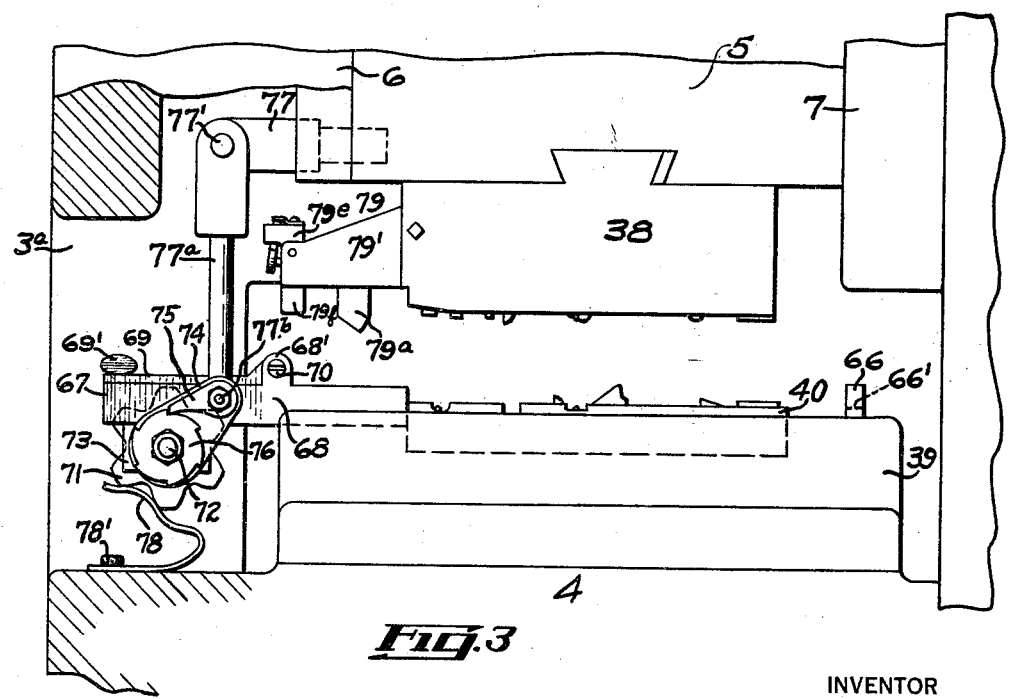
Fig. 3 is an enlarged front view of the forming dies, extracting mechanism and sizing mechanism.

34, 34 and 35, 35 are straightening rolls for the strip of metal or stock. These rolls are horizontally disposed and suitably mounted between the side walls 21, 21 on the bracket 19. A strip of metal, indicated by 36, is directed between the rolls 34, 34 and 35, 35 and between the gripping lips 26′ and 27′. The dog 27 and arm 28 are shaped and proportioned to have a slight rocking motion relative to the slide 22, so that in normal operation, as the connecting rod 30 is drawn to the right in Figs. 1 and 2 the gripping jaw 27′ is rocked out of engagement with the upper surface of the strip of metal 36.

The arm 28 then engages the stop 31 and the slide 22 recedes with the connecting rod 30. Upon the reversal of travel of the rod 30, it rocks forward the upper end of the arm 28 and causes the gripping jaw 27′ to engage the upper surface of the strip 36, thereby gripping the said strip firmly between the jaws 26′ and 27′, and the slide 22 and strip 36 are together fed forward.

38 represents as an entirety the movable die, it being suitably connected to the slide 5.

39 represents a bolster or die bed for the stationary die. It is detachably secured to the bed 4 in any suitable manner.

40 represents as an entirety the stationary die suitably secured in the die bed 39.

The dies 38 and 40, which cooperate with each other to form and assemble the links, are arranged in longitudinal alinement with the line of feed of the strip 36 and are properly centered relative to the said line of feed.

41, 42 are scoring knives or chisels arranged at the right hand end of the movable die 38 and adapted to impart lines of score to the upper surface of the strip of metal, which lines may be parallel in the direction of the feed of the said strip with the exception of a slight divergence at their right hand ends. This divergence from parallelism of the right hand ends of the chisels is for the purpose of ready assembling of the links, as will become obvious. 43, 44 are corresponding scoring knives or chisels carried by the stationary die 40 and arranged to impart lines of score to the under surface of the strip of metal, each of which lines is directly beneath a line of score imparted by one of the upper scoring knives.

45 is a severing and crimping element on the upper die having a convex crimping surface. It is arranged to cooperate with a cutting and bending knife 46 on the lower die. The lower die is recessed at 47 in front of the cutting knife 46 and beneath the severing and crimping element 45. The metal of the stationary die 40 in front of the recess 47 is cut away along the inclined line 48 to permit a section of the metal of each link blank to be bent downwardly by the severing and crimping element 45 after it has been severed at one end by the combined action of this element and knife 46.

49 is a curved forming or crimping element on the movable die 38, about which the metal for forming the smaller end bar or pintle is bent or crimped. In front of this former 49 is a recess 50.

51 is a forming and bending projection on the stationary die, it being adapted to enter the recess 50 on the movable die. 51′ is a shoulder on the projection 51 adapted to fold or crimp the metal for the smaller end of the link against the element 49 on the movable die.

52, 53 are end bar forming punch elements comprising two substantial quarter circles, 52′, 53′.

54 is a scoring knife on the movable die between the elements 52, 53, adapted to impart a transverse score to the upper surface of the strip of metal defining the detaching slot of each link.

55 is a scoring knife on the stationary die adapted to impart a transverse score to the strip of metal along the line of severance of two links which are to adjoin each other and in conjunction with the forming corners 51ᵃ, 51ᵇ is adapted to force the metal of the link to follow the quarter circles 52′, 53′ on the formers 52, 53. This scoring knife 55 is in vertical alinement with the scoring knife 54. In advance of the punch element 53 the movable die is recessed as indicated at 56 to allow clearance for the free upturning of the long lip of the metal blank for a link, which at this step of its formation projects upwardly from the metal strip. At 58 the stationary die is recessed to receive a cutting or severing knife 59 on the movable die, the edge 58' being a knife edge to work in conjunction with the knife 59 to sever the metal strip. Immediately in front of the cutting knife 59, the movable die is shaped as indicated at 60 to complete the rounding and formation of the small end bar of each link in cooperation with the recessed section 61 of the stationary die. At 62 the movable die is recessed for the purpose of engaging the longer section or lip of metal turned up from the central portion of each link blank and bending, curling and conforming it to the cylindrical shape desired, at the same time causing it to encircle the small end bar or pintle of the link in front of it thereby coupling or attaching these links together. The stationary die is recessed as at 63 to cooperate with the recessed portion 62 of the movable die in the final shaping and forming of the large end bar of each link. 64 is a mandrel extending transversely across the recessed portion 63 of the stantionary die, and 65 is a projection of said mandrel of the shape and size of the detaching slot. The mandrel serves to space the ends of the lips of metal forming the large end or sprocket bar of each link apart a predetermined distance and the projection serves to preserve the detaching slot, made by the scoring knife 54.

66 is a strip gage for centering the metal strip 36 relatively to the forming dies as it is fed forward, step-by-step. It may consist of a bar of metal arranged transversely on the stationary die bed 39 and suitably secured in position a little distance from the diverging ends of the scoring chisels 43, 44. In the top of this piece of metal is cut a V-shaped groove 66' with the axis of the V in the vertical central longitudinal plane of the dies. The walls of this V-shaped groove are preferably elevated somewhat above the horizontal plane of the stationary die and the width of the groove at its middle vertically is preferably of the width of the standard size strip to be used with the set of dies to which the gage is attached. The taper of this gage allows for variation in width of the strip of metal 36, so as to insure the proper centering of the strip despite its variation in width.

Mechanism may be employed for extracting and guiding the formed chain links out of the machine, of any suitable and well known character. For illustration, I have shown a chain guide 67, comprising two spaced apart bars one of which is denoted at 68, rigidly secured at its inner end to the die bed 39, and projecting into the opening 3ª through the adjacent wall of the main frame of the machine. These bars are longitudinally grooved and recessed to constitute a guideway for the chain.

The bars are recessed to receive a cover plate 69 which is pivotally connected at 70 between upwardly projecting ears 68' on the said guide bars. 69' is a thumb nut extending through a slot in the cover plate 69 and pivotally fitted into a guide bar 68 for the purpose of holding down the cover plate 69.

71 is a sprocket wheel arranged between and projecting between the guide bars 68. It is carried by a shaft 72 mounted in bearing blocks 73, each detachably secured to one of the aforesaid guide bars.

74 is a pawl carrying arm loosely mounted on the shaft 72.

75 is a pawl pivotally connected to the arm 74.

76 is a ratchet wheel rigidly secured to the shaft 72 and having its teeth in the plane of the pawl 75.

77 is a lug or projection carried by the slide 5. It is pivotally connected at 77' to a rod $77^a$, the lower end of which is pivotally connected at $77^b$ to the pawl arm 74.

78 is a spring having one end secured at 78' to the frame of the machine, and its other end bearing against the teeth of the sprocket wheel 71 to offer a frictional resistance to the rotation of the latter.

Any suitable mechanism may be employed for the purpose of correcting the size and pitch of the chain links. The size and pitch correcting mechanism is indicated as a whole by the reference numeral 79. Of this mechanism, 79' is an arm extending forward from and preferably detachably secured to the movable die 38. This arm 79' has formed preferably integrally with it, a downwardly extending finger $79^a$ which is pointed at its lower end as indicated at $79^d$, the rear surface $79^b$ of the said pointed finger being shorter than and at a greater inclination to the horizontal than the front surface $79^c$ of the said finger. This finger $79^a$ is arranged to enter the sprocket opening in the last link but one of the links formed in the machine.

$79^e$ is a block or finger pivotally connected at $79^{e'}$ in the bifurcated end of the arm 79'. This block or finger extends downwardly beneath the arm 79', as indicated at $79^f$ and is adapted to enter the sprocket opening in the link next preceding the link entered by the finger $79^a$.

$79^g$ is an adjustment screw fitted in the finger $79^e$ and adapted to extend on the rear side of the latter and bear against the arm 79'. Its purpose is to adjust the said finger $79^e$ about the axis of the pivot $79^{e'}$ and toward or from the finger $79^a$. The adjustment wheel $79^{g'}$ for the screw $79^g$ has a toothed or serrated periphery $79^h$.

$79^i$ is a lock pawl extending through an opening in the forward projection 79^k of the finger 79^e, and engaging with the periphery of the thumb wheel 79^g' to hold the wheel at any point of adjustment.

79^m is a spring bearing at one end against the lock pawl 79^i and having its other end secured at 79^m' to the finger 79^e.

The distance between the front wall of the downward extension 79^f of the finger 79^e and the rear wall of the finger 79^a remains substantially constant when the machine is in operation. If a link is shorter in pitch than it should be, these sizing fingers bring it up to proper pitch by stretching it. In practice, I have found it desirable to form and arrange the dies 38 and 40 for making of the desired and proper pitch, chain links from the thinnest sections of the strip of steel used, depending upon the stretcher or pitch correcting device 79 to draw the links formed from the thicker sections of the strip of metal up to gage.

The operation of the machine will be readily understood. A strip of metal 36 is directed through the feed mechanism until the gripping jaws 26', 27' of said feed mechanism can engage with it. Power is then applied through the countershaft 9 to actuate the feed mechanism and slide 5. The strip 36 is guided and centered by the gage 66, so as to lie properly between the dies 38 and 40. The slide 5 descends and the section of metal which is to form a link blank is first acted upon by the longitudinal scoring knives so as to score the upper and lower surfaces of the stock along the lines 80 and 81 as shown in Fig. 6. The upper die is then elevated and the feed mechanism operates to feed the stock forward one step. This brings the scored section in position to be operated upon by the crimping and severing elements 45, 46. The slide descends and the portion of metal tween the lines of longitudinal score is severed along the transverse line 82. The knife 46 bends upwardly, as indicated at 83, the section of the central portion or short lip of the link blank which is to be employed in forming the small end bar of the link. The action of the severing knife and crimper 45 is to press downwardly and crimp the end of the longer section of the central portion or long lip of the link blank, as indicated at 84, which is to be employed in forming the large end or sprocket bar of the link, before the severing of the sections takes place. The short lip 83 of each link blank is sufficiently raised for the knife 46 to give clearance for bending upwardly the long lip of the blank. When the slide is next elevated, the feed mechanism advances the stock another step. The slide descends and the projection 51 on the stationary die acts to bend upwardly the long narrow lip for the large end bar of the link, as indicated at 85, simultaneously breaking the metal of the link blank along the lines of scoring 80, 81 and freeing the said long, narrow lip so that it can remain tangent to the quarter circle 52' on the forming element 52. At the same time, the shoulder 51' on the projection 51 folds or crimps the short, narrow lip for the small end bar, as indicated at 86, against the convex forming surface of the element 49 on the upper die; and the forming element 52' on the upper die cooperates with the projection 51^a to throw the long, narrow lip of the link up into the recess 50, this long narrow lip remaining always tangent to the larger quarter circle 52' on the element 52. In cooperation with the scoring knives 54 and 55 and the crimping edge 51^a, the quarter circle 52' on the element 52 crimps the short wide lip for the large end bar of the link, as indicated at 87. The movable die ascends and the link blank is fed forward. Now when the movable die descends, the scoring knife 54 imparts its transverse score to the upper surface of the strip of metal directly in advance of the element 52 to provide the line of score 88 which, as shown, is arranged centrally of the link blank and is of a length a trifle greater than the width of the long lip of the sprocket or large end bar, and directly above the line of score 89 imparted to the end surface of the strip of metal by the scoring knife 55. The quarter circle 53' of the element 53 in cooperation with the scoring knives 54 and 55 and the crimping edge 51^b crimps the wide lip of the small end bar, as indicated at 90, and at the same time the narrow lip of the small end bar is thrown upward as indicated at 90'. The convex crimping surface of the element 59 cooperating with the forming edge 57' bends downwardly the wide lip of the large end bar to its proper position in a finished link, as indicated at 92, and simultaneously the narrow lip of the large end bar, remaining tangent to the quarter circle of the element 59, is thrown almost into a vertical position as indicated at 91. The slide is again elevated and the strip is fed forward another step, bringing the link blank into its final forming and assembling position. The slide descends and the element 62 commences to curl or roll the metal of the long, narrow lip of the sprocket or large end bar into cylindrical shape and around the small end bar or pintle of the next preceding link. The knife edge of the element 59 acting in conjunction with the knife edge 58' on the stationary die severs the link blank from the strip of metal along the lines of score made by the scoring knives 54, 55, defining the end of the short, wide lip of the sprocket or large end bar with a detaching slot 93 and detaching keepers 94 at the extremities of the slot (see Fig. 6). The small end bar is also beveled as indicated at 93' but this is only incidental. The element 63, mandrel 64, and projection 65 coact with the element 62 to complete the shape of the large end bar as indicated at 95. That is to say, the mandrel 64 spaces the ends of the sprocket or large end bar a predetermined distance apart, and the projection 65 of said mandrel insures that the detaching slot will have its intended location and dimensions. The small end bar completing shapers 60 and 61 cooperate to form the small end bar into its final shape as indicated at 96. The slide is then elevated and the extractor pulls the completed link out of the stationary die and advances it into position in which its small end bar is properly centered relative to the forming elements 62, 63 so that the large end bar of the next link in the series will be formed around it and these two bars thus assembled.

One sprocket tooth of the sprocket wheel 71 projects through a formed link in the guide 67, so that when the slide 5 is elevated the pawl carrying arm 74 is rocked in anticlockwise direction. The pawl 75 engages a tooth on the ratchet wheel 76 and turns the latter together with the shaft 72 and the sprocket wheel 71, the rotation of the sprocket wheel being sufficient to advance a formed link one step. When the slide next descends the pitch correcting finger 79ª enters the next to the last formed link, its surface 79ᵇ engages the large end bar of the last formed link and moves rearward the last formed link, positioning said link with its small end bar overlapping the end of the strip 36 and properly centered relative to the forming elements 62, 63, the stretching and pitch correcting finger 79ᶜ enters the link coupled to the link entered by the fingers 79ª, and these two fingers cooperate to correct the pitch of the links. At the next elevation of the slide the extractor operates to advance the formed link another step, and this step-by-step advancing of the formed links within the machine is continued, one link at a time being delivered from the machine.

It will be seen that the dies operate simultaneously to perform progressive steps in the formation from a strip of metal of a completed link, and to assemble it with the link next in front of it in the series.

I desire it understood that the sequence of certain of the steps of the method and the construction and arrangement of certain of the parts of the apparatus as illustrated and described can be changed, modified, or reversed within the principles and spirit of the invention. For example, the scoring knife 54 could be arranged at any one of several different positions on the movable or stationary die, and could be constructed to bevel or score an end of the sprocket or large end bar in a manner different from that shown. This fact is obvious and is not believed to require further description or explanation.

In Figs. 9 to 15 I have disclosed a pair of duplicate links capable of being manufactured and assembled by use of the apparatus and by practicing the method fully described.

Of each of these links, 97 denotes the side bars, 98 the small end bar, and 99 the sprocket or large end bar or end hook.

The small end bar, as shown, is of general curvilinear conformation, as indicated at 96, and the sprocket or large end bar consists of the long, relatively narrow lip 95 struck from the blank to define the side bars, and the short relatively wide lip 92 constituting the end portion of the link. The lips 95, 92 are of general curvilinear conformation, preferably together defining a broken cylinder or tube adapted to envelope or encircle the small end bar 96.

The free ends of the sprocket bar; i.e., the ends of the short, wide lip 92 and the long, narrow lip 95; are spaced apart a distance a little less than a measurement representing the mean thickness of the metal composing the links, and the end of the relatively wide lip 92 is provided with the centrally positioned detaching slot 93, desirably having length about equal to or slightly greater than the width of the long, relatively narrow lip 95, defining the detaching keepers 94 at the extremities of said slot.

The detaching slot 93 can be of any preferred depth and shape, and can be shorter or longer than shown. It is preferably of a depth which added to the distance between the ends of the lips of the sprocket or large end bar equals a measurement a trifle greater than or approximately equal to the probable maximum thickness of the sheet metal of which the duplicate links of a chain are composed.

In Fig. 16 I have disclosed a pair of duplicate links which are different from the links of Figs. 9 to 15 in one particular only, viz., the small end bar 96' of each of these links is flat.

The long, narrow lip 95 of one link, as clearly disclosed, enters the space between the side bars 97 of a different link when the links are assembled, and the short, wide lip 92 lies adjacent to or contiguous with the small end bar 96 or 96', as the case may be.

The manner in which a link constructed as illustrated and described can be removed from a strand of chain having similar links is best disclosed in Fig. 15. The side bars of the link the small end of which is shown joined are first arranged to be in alinement with the space between the detaching keepers 94 and the end of the long, narrow lip 95, and the link to be disjoined is then hammered or otherwise manipulated transversely of the adjoining link until one of its side bars has passed a detaching keeper 94. This side bar can then be freely moved through the length of the detaching slot 93, as will be understood, and can afterwards be moved past the other detaching keeper 94. Obviously, but one side bar must pass the keepers when two links are given relative transverse movement, the other side bar always being free of the keepers at the commencement of the relative transverse movement.

But a single hammer blow would, evidently, be required to remove a side bar past each keeper, if in fact even this much force would be necessary, it being apparent that the links can be shifted relatively to each other so that a side bar being forced past the keepers can have relation to the end of the long, narrow lip of the sprocket bar and detaching keepers other than the parallel relation necessary when removing a side bar in the instance of a link such as Osswald's. That is to say the present links can be positioned relatively to each other to arrange a side bar to be removed at an oblique angle to the free end of the long, narrow lip and the free end of a detaching keeper to be passed, the depth of the detaching slot added to the distance between the ends of the sprocket bar allowing for this oblique arrangement, and manipulated past said free ends without any considerable difficulty, more or less difficulty depending upon the distance between the detaching keepers and the free end of the long, narrow lip relatively to the thickness of the metal of the link, and also depending upon the length of the detaching slot relatively to the width of the long, narrow lip. To manually replace a link the operations described are reversed.

Whereas, considerable and continuous force is required to remove from a strand of chain or manually replace in said strand a link constructed as illustrated and described in the Osswald patents, hereinbefore identified, the link of the present invention can be readily and quickly removed from or manually replaced in a strand by the expenditure of but a small amount of effort. At the same time, the novel link fully illustrated and described is no more liable than the Osswald link to become accidentally displaced from chain when in use.

Many alterations in the construction, and many apparently widely differing embodiments and applications of the invention will suggest themselves to those skilled in the art of making sheet metal chain links and chain making machines, without departing from the scope and spirit thereof. The disclosures and description herein are purely illustrative, and are not intended to be in any sense limiting.

What I claim is:—

1. In a machine for making a chain link from a blank of sheet metal, said link having side bars, a relatively small end bar, and a sprocket bar adapted to encircle a small end bar of a different link, said sprocket bar being constituted by spaced apart lips one of which is adapted to be arranged between side bars of said different link and the other of which has a detaching slot intermediate the extremities of its end, the said lips being spaced apart a distance less than the thickness of said sheet metal, the combination with a plurality of cooperating dies, each die consisting of link forming and shaping elements arranged to act progressively upon the blank, of a scoring knife and a mandrel associated with said dies for defining said detaching slot and for preserving it during shaping operations on the link, respectively.

2. The process of making a chain from a blank of sheet metal, each link of the chain having side bars, a relatively small end bar, and a relatively large end bar adapted to encircle an end bar of a different link, said large end bar consisting of lips having their ends spaced apart a distance less than the thickness of the sheet metal, and one of said ends having a detaching slot intermediate its extremities and adjacent the end of said other lip for the purpose specified, which consists in scoring said blank to define the inner edges of the side bars of the link, in severing and crimping the central portion of the link blank between said lines of score, in scoring said blank to define said detaching slot in severing and shaping the blank at said last-named score to form the lip end having the slot therein, in shaping the severed and crimped portion of the link blank to provide said large end bar, in uniting said large end bar to a small end bar of an adjacent link, and in preserving said detaching slot during the final shaping and uniting operations upon said severed and crimped metal.

3. The process of making a chain from a blank of sheet metal, each link of the chain having side bars, a relatively small end bar and a relatively large end bar adapted to encircle a small end bar of a different link, said large end bar consisting of lips having their ends spaced apart a distance less than the thickness of the sheet metal and one of said lip ends having a detaching slot intermediate its extremities and adjacent the end of the other lip for the purpose specified, which consists in transversely scoring the blank on one face thereof with the score equal in length in said detaching slot, severing the blank at said score, forming one of the portions of the severed blank into a lip of said large end bar, with said score forming the detaching slot therein, and uniting the severed blank to an adjacent link by forming the said large end bar about the small end bar of said adjacent link.

4. The process of making a chain from a blank of sheet metal, each link of the chain having side bars, a relatively small end bar and a relatively large end bar adapted to encircle a small end bar of a different link, said large end bar consisting of lips having their ends spaced apart a distance less than the thickness of the sheet metal, one of said lip ends having a detaching slot intermediate its extremities and adjacent the end of the other lip for the purpose specified, which includes the steps of transversely scoring the blank on one face thereof with the score equal in length to said detaching slot, severing the blank at said score to provide a lip of said large end bar having said detaching slot therein, and uniting the severed blank to an adjacent link by forming the said large end bar about the small end bar of said adjacent link.

5. The process of making a chain from a blank of sheet metal, each link of the chain having side bars, a relatively small end bar and a relatively large end bar adapted to encircle a small end bar of a different link, said large end bar consisting of lips having their ends spaced apart a distance less than the thickness of the sheet metal, one of said lip ends having a detaching slot intermediate its extremities and adjacent the end of the other lip for the purpose specified, which includes the steps of transversely scoring the blank on one face thereof to form a V-shaped score equal in length to said detaching slot, severing the blank at said score to form a lip edge with one side of said V forming a wall of the detaching slot therein, and uniting the severed blank to an adjacent link by forming the said large end bar about the small end bar of said adjacent link.

6. The process of making a chain from a blank of sheet metal, each link of the blank having side bars, a relatively small end bar and a relatively large end bar adapted to encircle a small end bar of a different link, said large end bar consisting of lips having their ends spaced apart a distance less than the thickness of the sheet metal, one of said lip ends having a detaching slot intermediate its extremities and adjacent the end of the other lip for the purpose specified, which includes the steps of transversely scoring the blank on one face thereof completely across the blank, scoring the blank on the opposite face to form a score substantially opposite and parallel to said first-named score and equal in length to said detaching slot, severing the blank at said scores to provide a lip of said large end bar having said detaching slot therein, and uniting the severed blank to an adjacent link by forming the said large end bar about the small end bar of said adjacent link.

Signed at Bridgeport in the County of Fairfield and the State of Connecticut this 1st day of March A. D., 1923.

SYLVANUS D. LOCKE.